(12) United States Patent
Marra et al.

(10) Patent No.: US 9,959,250 B2
(45) Date of Patent: May 1, 2018

(54) OVERLAYING PHOTOGRAPHS WITH TEXT ON A SOCIAL NETWORKING SYSTEM

(71) Applicant: Facebook, Inc., Menlo Park, CA (US)

(72) Inventors: Gregory Matthew Marra, San Francisco, CA (US); Christopher Struhar, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 222 days.

(21) Appl. No.: 15/147,685

(22) Filed: May 5, 2016

(65) Prior Publication Data

US 2016/0246760 A1 Aug. 25, 2016

Related U.S. Application Data

(63) Continuation of application No. 13/842,301, filed on Mar. 15, 2013, now Pat. No. 9,361,278.

(51) Int. Cl.
| | |
|---|---|
| *G06F 17/21* | (2006.01) |
| *G06Q 50/00* | (2012.01) |
| *G06Q 10/10* | (2012.01) |
| *G06T 11/60* | (2006.01) |
| *H04L 12/58* | (2006.01) |

(52) U.S. Cl.
CPC .......... *G06F 17/212* (2013.01); *G06Q 10/10* (2013.01); *G06Q 50/01* (2013.01); *G06T 11/60* (2013.01); *H04L 51/043* (2013.01); *H04L 51/10* (2013.01); *H04L 51/32* (2013.01)

(58) Field of Classification Search
CPC ........ G06F 17/21; G06F 17/211; G06F 17/24; G06F 17/241; G06F 17/25; G06F 17/30; G06F 17/30017; G06F 17/30056

USPC ....... 715/201, 202, 230, 232, 243, 246, 247, 715/253

See application file for complete search history.

(56) References Cited

U.S. PATENT DOCUMENTS

| | | | |
|---|---|---|---|
| 5,424,945 A | 6/1995 | Bell | |
| 6,005,972 A | 12/1999 | Fredlund et al. | |
| 6,304,660 B1 * | 10/2001 | Ehrhart | ............ A63F 3/06 380/231 |
| 6,711,291 B1 | 3/2004 | Stubler et al. | |
| 7,272,258 B2 | 9/2007 | Berkner et al. | |
| 7,330,608 B2 | 2/2008 | Berkner et al. | |
| 7,463,787 B2 | 12/2008 | Atsumi et al. | |
| 8,046,713 B2 | 10/2011 | Yamashita | |

(Continued)

OTHER PUBLICATIONS

How to Tell if an Image is Edited; Nov. 3, 2012; imageedited.com; pp. 1-3.*

(Continued)

*Primary Examiner* — Andrew R Dyer

(74) *Attorney, Agent, or Firm* — Fenwick & West LLP

(57) ABSTRACT

When a social networking system receives an image and associated text for presentation to one or more users, the social networking system determines how to present the text and the image. For example, the social networking system determines if to overlay the text onto an area of the image. A readability score indicating the readability of the text if overlaid onto an area of the image is determined based on attributes of the image and of the text. Using the readability score, the social networking system overlays the text onto an area of the image when presented to other users or presents the text adjacent to the image when presented to other users.

10 Claims, 4 Drawing Sheets

(56) References Cited

U.S. PATENT DOCUMENTS

| | | |
|---|---|---|
| 8,384,954 B2 | 2/2013 | Honma |
| 8,549,390 B2 * | 10/2013 | Patrick ................ G06F 17/2229 713/180 |
| 8,611,724 B2 | 12/2013 | Matsutani |
| 8,635,537 B1 | 1/2014 | Kan et al. |
| 8,718,367 B1 | 5/2014 | Schneider et al. |
| 9,477,647 B2 * | 10/2016 | Patrick ................ G06F 17/2229 |
| 2003/0035591 A1 | 2/2003 | Crabtree |
| 2003/0200505 A1 | 10/2003 | Evans |
| 2005/0050062 A1 * | 3/2005 | Hanes ............... G06F 17/30858 |
| 2005/0157926 A1 | 7/2005 | Moravec et al. |
| 2005/0240878 A1 | 10/2005 | Anthony et al. |
| 2006/0077419 A1 * | 4/2006 | Sugiura ............. H04N 1/00912 358/1.14 |
| 2006/0109510 A1 | 5/2006 | Widdowson et al. |
| 2006/0126932 A1 | 6/2006 | Eschbach |
| 2006/0132857 A1 * | 6/2006 | Akashi ................... G06K 15/02 358/448 |
| 2006/0136491 A1 | 6/2006 | Berkner et al. |
| 2006/0200759 A1 | 9/2006 | Agrawala et al. |
| 2006/0212801 A1 | 9/2006 | Berker et al. |
| 2007/0162842 A1 | 7/2007 | Ambachtsheer et al. |
| 2008/0222560 A1 | 9/2008 | Harrison |
| 2009/0141931 A1 * | 6/2009 | Yadid-Pecht ......... G06T 1/0035 382/100 |
| 2010/0073398 A1 | 3/2010 | Fisher et al. |
| 2010/0076850 A1 | 3/2010 | Parekh et al. |
| 2010/0180184 A1 * | 7/2010 | Kitamaru ................ G06F 17/21 715/204 |
| 2011/0280497 A1 | 11/2011 | Berger et al. |
| 2012/0166532 A1 | 6/2012 | Juan et al. |
| 2012/0192048 A1 | 7/2012 | Suzuki et al. |
| 2013/0124499 A1 | 5/2013 | Liau |
| 2013/0183021 A1 | 7/2013 | Osman |
| 2013/0335783 A1 | 12/2013 | Kurtz et al. |
| 2013/0339907 A1 | 12/2013 | Matas et al. |
| 2014/0026038 A1 | 1/2014 | Lee et al. |
| 2014/0163956 A1 | 6/2014 | Tesch et al. |
| 2014/0245115 A1 | 8/2014 | Zhang et al. |
| 2016/0378729 A1 * | 12/2016 | Patrick ................ G06F 17/2229 715/205 |

OTHER PUBLICATIONS

United States Office Action, U.S. Appl. No. 13/842,301, dated Sep. 29, 2015, twenty-two pages.
United States Office Action, U.S. Appl. No. 13/842,301, dated Jun. 19, 2015, eighteen pages.

* cited by examiner

OVERLAYING PHOTOGRAPHS WITH TEXT ON A SOCIAL NETWORKING SYSTEM

CROSS REFERENCE TO RELATED APPLICATIONS

This application is a continuation of U.S. application Ser. No. 13/842,301, filed Mar. 15, 2013, which is incorporated by reference in its entirety.

BACKGROUND

This invention relates generally to social networking systems, and in particular to overlaying text onto photographs presented on a social networking system.

A social networking system allows users to connect to and communicate with other social networking system users. Users create profiles on the social networking system that include information about the users, such as interests and demographic information. The users may be individuals or entities such as corporations or charities. The increasing popularity of social networking systems and the significant amount of user-specific information maintained by social networking systems make a social networking system an ideal forum for users share content, such as photographs or text content, with other users. This sharing of content allows users to share their interests and experiences with other users.

Conventionally, social networking systems allow users to post content about themselves and other users for presentation by the social networking system. Content posted to a social networking system may include text and/or images associated with a user providing the content. For example, a user provides content to the social networking system indicating that it was at a specific location by checking in at the location and uploading a photograph taken at the location. The content provided by the user is presented to other social networking system users.

If content provided by the user includes an image as well as text, the text may be presented adjacent to the image or overlaid onto the image. While overlaying text on an image may conserve space or enhance the aesthetic display of the content, text that is overlaid onto an image may be difficult to read because of the image content. In some cases, details in the image, such as areas of highly contrasting colors, may obscure the text. For example, it may be difficult to read text overlaid onto a photograph of a zebra due to the highly contrasting colors of a zebra's stripes. Additionally, text overlaid onto an image may obstruct details in the image, such as faces, other text included in the image photograph, or other important content in the photograph. Hence, while overlaying text onto a photograph may be desirable in general, in many cases it should be avoided.

SUMMARY

Social networking systems allow users to upload images, such as photographs, and associated text for presentation to other social networking system users. For example, images and text received from a user may be included in stories presented to other social networking system users. The stories may be presented individually or in a feed (e.g., a newsfeed or a timeline associated with a user) to other users. For example, a user provides a photograph taken with friends at a theme park along with a text description of the photograph in a status update provided to the social networking system. A story including the photograph and text is presented by the social networking system to other social networking system users connected to the user. To allow users to more easily read the content presented by the story, the social networking system determines whether to overlay text included in a story with an image included in the story.

When presenting stories including text and images to users, the social networking system evaluates factors associated with the images and text to determine whether to overlay the text onto the images. The social networking system calculates a score ("readability score") associated with each image and accompanying text in a story. If a readability score for an image and its associated text satisfies a condition, such as having at least a threshold value, the text is overlaid on the associated image when presented in the story. However, if the readability score for an image and its associated text does not satisfy the condition (e.g., is less than the threshold value), the story presents the text adjacent to the associated image.

Various attributes of an image may be used when determining a readability score for an image and associated text. For example, text overlaid onto original photographs is generally more visible for reading than text overlaid onto images that have been digitally altered (i.e., "synthetic" images). Hence, a readability score accounts for whether or not an image is a synthetic image. Various factors may determine whether an image is a synthetic image; for example, homogeneity of areas of the image, location tags in the image, and detection of pre-existing text in the image, metadata associated with the image indicating the image has been digitally altered, or other suitable factors may determine whether an image is a synthetic image. Other factors for determining a readability score include the likelihood that faces in the image will be obscured by overlaying text onto the image, the length of the text associated with the image, the resolution of the image, and the dimensions of the image.

In one embodiment, determination of whether to overlay text on an image is manually performed by an administrator of the social networking system. Multiple images (e.g., an album) may be scored together to determine whether to overlay text across one or more images within the album. Additionally, an image may be cropped and/or text may be truncated and the cropped image and/or truncated text may be considered when determining readability scores.

Figure 1:
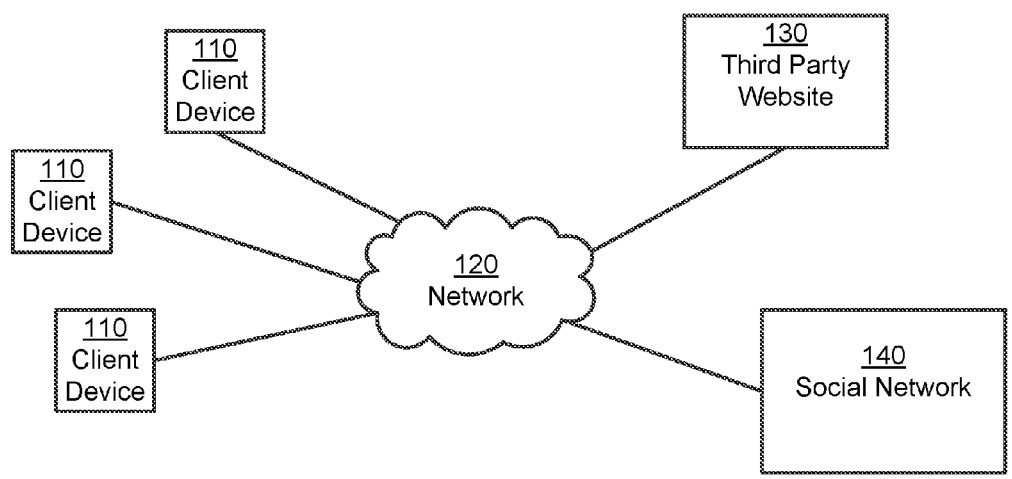
FIG. 1 is a block diagram of a system environment in which a social networking system operates, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to create posts including both images and text for presentation to other social networking system users. For example, a story describing a post is presented to various social networking system users. When presenting a story describing a post including text and an image, the social networking system determines whether to present the text adjacent to the image or overlaying the image. If the social networking system determines that the text is readable when overlaid onto the image, the text and image, the text is overlaid on the image to form a composite image that is displayed. However, if the social networking system determines that the text is not readable when overlaid onto the image, the social networking system presents the text and image as separate items; for example, the text is displayed adjacent to the image.

To determine whether text is readable when overlaid onto an image, the social networking system computes a readability score for a combination of text and an image. The readability score describes the ease with which text may be read by a user when overlaid onto different areas of the image. In one embodiment, a higher readability score indicates that the text is more likely to be readable by the user if overlaid onto an area of the image and vice versa. If the readability score for a combination of text and an image satisfies a condition (e.g., has at least a threshold value), the text is overlaid onto an area of the image when the text and image are presented to a user. If the readability score does not satisfy the condition (e.g., it is below the threshold value), the text and the image are separately presented. For example, the text is presented adjacent to the image. The readability score may also be used determine an area of the image over which the text is overlaid (e.g., top, bottom, side, etc). Various factors may be used to determine the readability score for a combination of an image and text. Examples of factors include: the likelihood that faces in the image will be obscured by overlaying the image with text, metadata associated with the image indicating that the image has been digitally altered, homogeneity of areas of the image, existence of location tags in the image, detection of text in the image, the length of the text, the resolution of the image, and the dimensions of the image.

In one embodiment, multiple images, such as images included in an album, are scored together. Additionally, images may be cropped when the readability score is being determined, so factors associated with the cropped images are used to determine the readability score. Further, text may be may be truncated during the scoring process, so the factors used to determine the readability score are based on the truncated text and the image. In some embodiments, the determination of whether to overlay text over an image is performed manually.

System Architecture

FIG. 1 is a high level block diagram illustrating a system environment 100 for a social networking system 140. The system environment 100 comprises one or more client devices 110, a network 120, one or more third party websites 130, and a social networking system 140. In alternative configurations, different and/or additional components may be included in the system environment 100. The embodiments described herein can be adapted to online systems that are not social networking systems.

The client devices 110 comprise one or more computing devices capable of receiving input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), a tablet computer, a mobile telephone, a smart-phone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

The client devices 110 are configured to communicate information via the network 120, which may comprise any combination of local area and/or wide area networks, using both wired and wireless communication systems. In one embodiment, the network 120 uses standard communications technologies and/or protocols. Thus, the network 120 may include communication channels using technologies such as Ethernet, 802.11, worldwide interoperability for microwave access (WiMAX), 3G, 4G, code division multiple access (CDMA), digital subscriber line (DSL), or other suitable communication technologies. The network 120 may use any suitable networking protocol or combination of networking protocols, such as multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML), or any other suitable format. In addition, all or some of the communication channels may be encrypted using conventional encryption technologies such as secure sockets layer (SSL), transport layer security (TLS), and Internet Protocol security (IPsec). The third party website 130 may be coupled to the network 120 for communicating with the social networking system 140, which is further described below in conjunction with FIG. 2.

Figure 2:
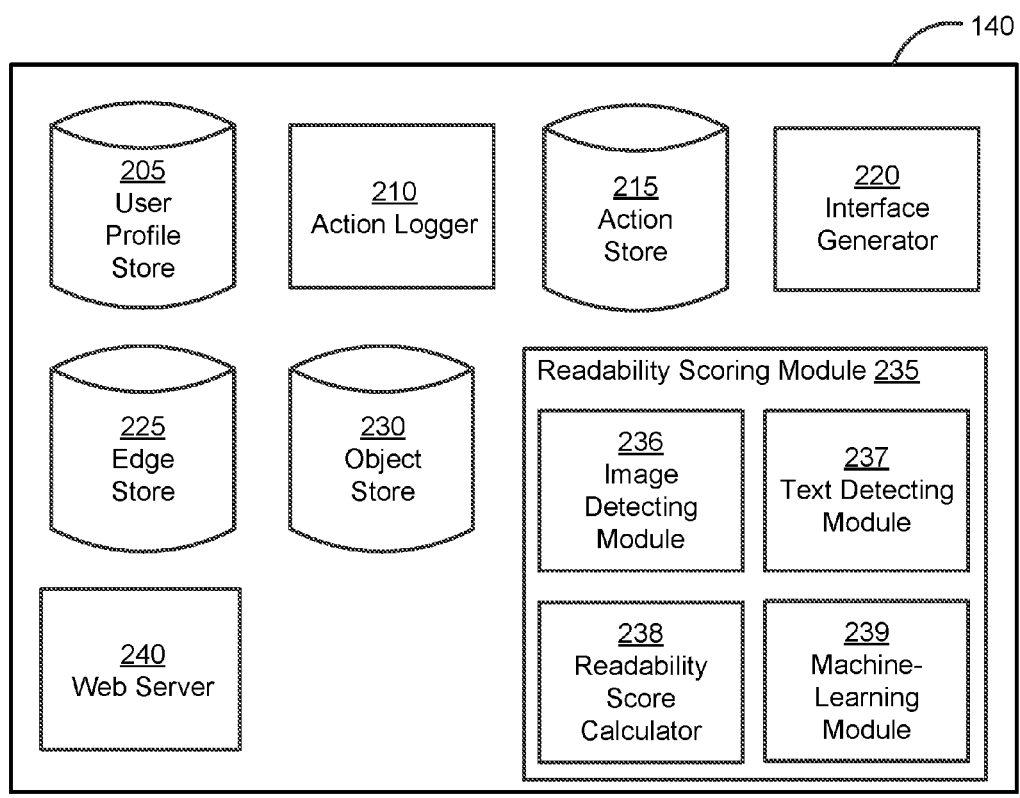
FIG. 2 is a block diagram of a social networking system, in accordance with an embodiment of the invention.

FIG. 2 is a block diagram of an example architecture of the social networking system 140. In the example shown by FIG. 2, the social networking system 140 includes a user profile store 205, an action logger 210, an action store 215, an interface generator 220, an edge store 225, an object store 230, a readability scoring module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user account and each user account is typically associated with a single user profile stored in the user profile store 205. A user profile includes declarative information about the user that was explicitly shared by the user, and may also include profile information inferred by the social networking system 140. A user profile may include multiple data fields, each data field describing one or more attributes of the corresponding user of the social networking system 140. Hence, information stored in the user profile store 205 describes characteristics of the users of the social networking system 140, including biographic, demographic, and other types of descriptive information, such as work experience, educational history, gender, hobbies or preferences, location, and any other suitable information. User profile information may also include data describing one or more relationships between a user and other users. Additionally, the user profile store 205 may also store other information provided by the user, for example, images, videos, or other objects; objects associated with a user and stored in a user profile may be organized into collections, which are further described herein. A user profile in the user profile store 205 may also maintain references to actions performed by the corresponding user that are stored in the action store 215.

While user profiles are frequently associated with individuals, user profiles may also be stored for entities such as businesses or organizations. This allows an entity to establish a presence on the social networking system 140 for connecting to other social networking system users and for exchanging content with other social networking system users. While an administrator or individual associated with the entity creates the user profile for the entity, the entity is identified as the account-holder associated with the user profile. The entity may post information about itself, about its products, including catalogs of products, or provide other information to users of the social networking system 140 using a brand page associated with the entity's user profile. Other users of the social networking system 140 may connect to the brand page to receive information posted to the brand page or to receive information associated with the brand page. A user profile associated with the brand page may include information about the entity itself, providing users with background data or other information about the entity.

The action logger 210 receives communications describing user actions internal to and/or external to the social networking system 140 and populates the action store 215 with information describing the user actions. Such actions may include, for example, adding a connection to another user, sending a message to another user, uploading an image, reading a message from another user, viewing content associated with another user, attending an event posted by another user, among others. In addition, a number of actions described in connection with other objects are directed at particular users, so these actions are associated with those users as well. These actions are stored in the action log 220. Some actions may be performed by users while not connected to the social networking system 140 and these actions are logged and communicated to the social networking system 140 when a connection is established.

The action store 215 maintains information describing actions by social networking system users internal to the social networking system 140, as well as actions performed via third party websites 130 that communicate information to the social networking system 140. Users may interact with various objects maintained by the social networking system 140, and these interactions are stored in the action store 215. Examples of actions stored by the action store 215 include: commenting on posts, sharing links, and checking-in to physical locations via a mobile device or other client device 110. Additional examples of interactions with objects on the social networking system 140 included in the action store 215 include commenting on a photo album, communications between users, becoming a fan of a musician, adding an event to a calendar, joining groups, becoming a fan of a brand page, creating an event, authorizing an application, using an application, interacting with an advertisement, collecting a product, and engaging in a transaction.

The interface generator 220 generates one more interfaces allowing users to interact with the social networking system 140. For example, the interface generator 220 generates one or more web pages including content from the social networking system 140, such as images, video, profile information, or other data. The interface generator 220 also generates one or more interfaces for receiving information from social networking system users via a client device 110 and the network 120. For example, the interface generator 220 generates a form for a user to provide the social networking system 140 with biographic information for creating a user profile. When another user requests a profile page including information describing a user, the interface generator 220 retrieves data from the user profile store 205 and generates a representation of the information in the user profile for presentation by a client device 110.

The interface generator 220 also generates a post interface allowing users to provide content to the social networking system 140 for presentation to other social networking system users. For example, the post interface allows a user to create a post of content including text and/or image data when checking in at a location or when updating his status. The post interface may display options allowing a user to provide text to the social networking system 140 or to upload an image, a video, audio data, or other information to the social networking system 140 for inclusion in a post of content presented to other social networking system users. When content is received from a user, the interface generator 220 generates a story describing the content and identifying the user providing the content, and the generated story may be presented to other social networking system users. For example, the story is included in newsfeeds including multiple stories that are presented to various users connected to the user providing the content, the story is included in a timeline describing content received from the user providing the content, or the story is presented to social networking system users through any suitable channel. A story may be presented with interface elements allowing users presented with the story to interact with the story by interacting with the interface elements (e.g., share the story, comment on the story, express a preference for the story, etc.) Presentation of content via a story is further described below in conjunction with FIGS. 3 and 4.

The edge store 225 includes information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Establishing a connection to a user in a social networking system 140 may allow more access to additional information about the user to which the connection was established. For example, connected to each other may receive informational updates about each other, such as stories describing actions performed by one of the users on the social networking system 140, Other edges are generated when users interact with objects in the social networking system 140, such as expressing interest in a page on the social networking system 140, sharing a link with other users of the social networking system 140, and commenting on posts made by other users of the social networking system 140.

The edge store 225 stores information describing edges, such as affinity scores for objects, interests, and other users.

Affinity scores may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 225, in one embodiment. In some embodiments, connections between users may be stored in the user profile store 205, or the user profile store 205 may access the edge store 225 to determine connections between users.

The object store 230 stores information about content maintained by the social networking system 140. Different content items, which represent individual pieces of content provided by the social networking system 140 to users, are stored as objects in the object store 230. Examples of objects include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications or third-party applications separate from the social networking system 140. An object in the object store 230 may represent an entity existing within the social networking system 140 (e.g., an application available on the social networking system 140), a virtual entity outside of the domain of the social networking system 140 (e.g., a website), or a physical entity (e.g., a sports team or a retail store).

The object store 230 includes information for presenting a content item to a user. For example, the object store 230 includes a media item or data for executing an application. Alternatively, the object store 230 includes a pointer or a reference to a destination associated with an object, such as the uniform resource locator (URL) of an external media item. Additionally, the object store 230 may also store metadata associated with an object, such as a name describing the object (e.g. "Charles Williams" for a page for a person, "Birthday Reminder" for an application, or "Penguin Fanciers" for a group), an image representing the object (e.g., a user profile picture), or one or more tags assigned to the object by users (e.g. text strings "game," "crime," and "strategy" for a strategy game application). Different types of metadata may be associated with different types of objects, and a metadata associated with an object identifies the type of the object. For example, user identifiers are associated with a group object, a media type identifier (e.g., "video") is associated with a media item object, and a user identifier is associated with a user object.

The readability scoring module 235 determines a measure of whether text associated with an image is likely to be readable by social networking system users when overlaid onto an area of the image and presented to social networking system users. In one embodiment, the readability scoring module 235 computes a readability score for a combination of text and an image for overlaying the text onto an area of the image. The readability score indicates the readability of the text when overlaid onto the image. In one embodiment, a higher readability score indicates that the text is more likely to be readable by social networking systems when overlaid on the image. Based on the readability score of the combination of text and the image, the interface generator 220 presents the text overlaid onto the image or presents the text separate from the image in a story. If the readability scoring module 235 determines that text may be overlaid onto more than one area of an image and be readable, the readability scoring module 235 may compare the readability scores for overlaying the text on the different areas of the image to select an area of the image over which to overlay the text. In the example shown by FIG. 2, the readability scoring module 235 includes an image detecting module 236, a text detecting module 237, a readability score calculator 238, and a machine-learning module 239.

The image detecting module 236 identifies features of an image affecting the readability of text overlaid on the image, these features are used when determining the readability scores for text overlaid on one or more areas of the image. Examples of features of an image include: whether the image includes any faces or areas of homogeneity, locations of faces or areas of homogeneity within the image, whether the image is associated with metadata indicating that the image has been digitally altered, whether the image is associated with one or more location tags, dimensions of the image, and the resolution of the image. To determine whether the image includes any areas of homogeneity, the image detecting module 236 determines the size of areas of an image having a threshold likelihood of being homogeneous, color distribution over the areas, and the magnitude of color contrast over the areas.

If text associated with an image is to be presented in a specific color, the image detecting module 236 determines the magnitude of color contrast between areas of the image and the associated text when determining whether the image includes areas of homogeneity. In some embodiments, the image may be cropped manually or automatically. For example, the top or the bottom of an image may be cropped or the image may be cropped to center faces or other portions of the image. If the image is cropped, the image detecting module 236 uses features of the cropped image to determine readability of text overlaid on the cropped image.

The text detecting module 237 identifies features of text associated with an image to determine a readability score for the combination of text and the image. For example, the text detecting module 237 determines the length of the text. In some embodiments the readability scoring module 235 truncates the text (e.g., if a certain character count is exceeded) or enlarges or shrinks the size of the text to improve the likelihood of the text being readable by a user (e.g., increases the font size of the text is increased if it is smaller than a threshold font size or decreases the font size of the text if the length of the text exceeds a threshold). If the text is modified, the text detecting module 237 accounts for the modifications. For example, if text has been truncated, the text detecting module 237 determines the length of text to be overlaid onto an image is shorter than the original text. In one embodiment, the overlaid text also includes an interface element to allow a user to view the complete text (e.g., an interface element for presenting the full text), so the text detecting module 237 accounts for presentation of the interface element along with the truncated text. The text detecting module 237 may also determine whether the image includes text. For example, the text detecting module 237 identifies a sign reading "RMS Titanic" in a photograph of a replica of the Titanic. Text and its location in an image may be detected using optical character recognition (OCR) or by any other suitable method.

The readability score calculator 238 evaluates factors associated with an image and text to generate a readability score, or readability scores, for the combination of the image and the text. Examples of factors include: the likelihood of obscuring faces in the image by overlaying the image with the text, metadata associated with the image indicating that the image has been digitally altered, homogeneity of areas of the image, length of the text, text within the image, location tags associated with the image, resolution of the image, and dimensions of the image. Determination of a readability score from the factors is further described below in conjunction with FIGS. 3 and 4. Alternatively, the readability score calculator 238 identifies the combination of text and the image for a manual determination of whether and where to overlay the text onto the image.

The machine-learning module 239 applies one or more machine-learning methods to detect and to assign scores to factors for generating the readability score based on manual classification and/or user feedback. For example, the machine-learning module 239 is trained to identify characteristics of text and images corresponding to a high or low likelihood of a user reading text overlaid onto an image. For example, implicit or explicit user feedback received by the social networking system 140 may indicate that text similar to the text for which feedback was received should be displayed adjacent to, rather than overlaying, images similar to those for which the feedback was received. Implicit user feedback may be received, for example, when a high proportion or a low proportion of users that viewed an image overlaid with text accessed the image. Explicit user feedback indicating that text should not be overlaid onto an image may be received when users indicate they are unable to read text overlaid onto the image. Different machine-learning methods may be used to calculate the readability score based on various types of available information associated with images and/or text.

The web server 240 links the social networking system 140 via the network 120 to the one or more client devices 110, as well as to the one or more third party websites 130. The web server 240 serves web pages, as well as other web-related content, such as JAVA®, FLASH®, XML and so forth. The web server 240 may receive and route messages between the social networking system 140 and the client device 110, for example, instant messages, queued messages (e.g., email), text and short message service (SMS) messages, or messages sent using any other suitable messaging technique. A user may send a request to the web server 240 to store a content item in the object store 230 or to retrieve a content item from the object store 230. Additionally, the web server 240 may provide API functionality to send data directly to native client device operating systems, such as IOS®, ANDROID™, WEBOS® or RIM®.

Determining Whether to Overlay Text onto an Image

Figure 3:
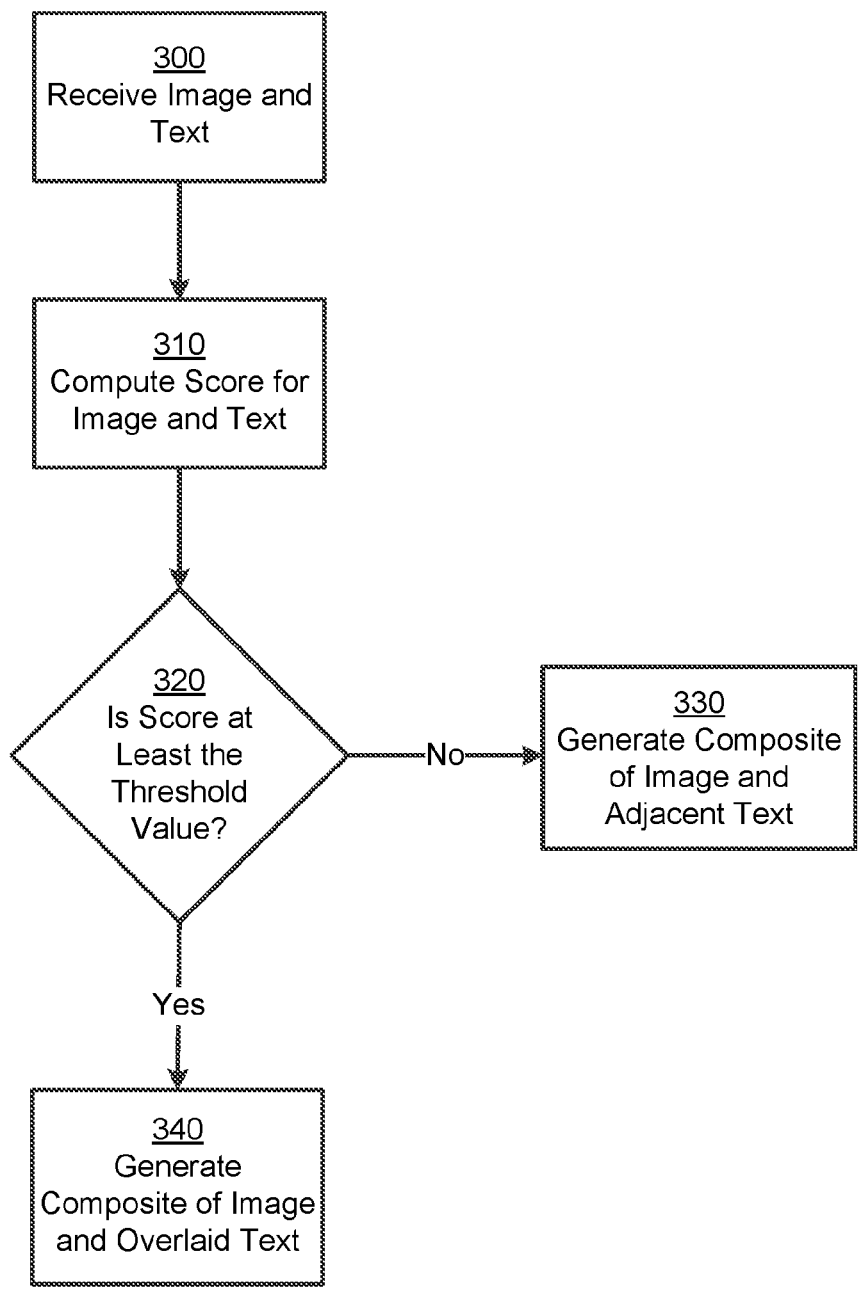
FIG. 3 is a flow chart of a method for determining visibility of text overlaid onto an image, in accordance with an embodiment of the invention.

FIG. 3 is a flow chart of one embodiment of a method for determining whether text is readable if it is overlaid onto an image. The social networking system 140 receives 300 an image and associated text from a user through the post interface. For example, the interface generator 220 provides a post interface to a user of the social networking system 140 and the social networking system 140 receives 300 the text and the image via the post interface. The readability score calculator 238 computes 310 a readability score for the combination of the received text and the image based on information from the image detecting module 236 and text detecting module 237. As further described above in conjunction with FIG. 2, the readability score provides a measure of the likelihood that a user is able to read the text if it is overlaid on one or more areas of the image. Various attributes of the text and the image are used to compute 310 the readability score. Examples of attributes for computing 310 the readability score include: the likelihood of obscuring faces in the image by overlaying the image with the text, metadata associated with the image indicating that the image has been digitally altered, homogeneity of areas of the image, length of the text, text included in the image, location tags associated with the image, resolution of the image, dimensions of the image, and any other suitable attributes. Attributes used for computing 310 the readability score are further described below. The image and/or the text may be modified (e.g., cropping the image, truncating the text) and the readability score computed 310 based on attributes of the modified image and/or text. The readability score may be calculated 310 manually based on an administrator's review of the text and the image to determine whether to overlay the text on the image.

In one embodiment, the readability scoring module 235 determines 320 whether the readability score satisfies a condition (e.g., determines 320 whether the readability score has at least a threshold value). For example, the readability scoring module 235 determines 320 whether the readability score equals or exceeds the threshold value 320. The threshold value specifies a minimum likelihood of a user being able to read text overlaid onto an image. If the readability score does not satisfy the threshold value (e.g., the readability score is less than the threshold values), the interface generator 220 generates 330 a story that separately presents the image and the text; for, example, the story includes the image and the text in a format where they are presented adjacent to each other. If the readability score satisfies the condition (e.g., the readability score is equal to or greater than the threshold value), the interface generator 220 generates 340 a story that presents the image and the text in a format where the text is overlaid onto an area of the image.

In one embodiment, the social networking system 140 specifies the threshold value based on one or more machine-learning methods, manual scoring, and/or user feedback. The threshold value may be modified over time by the readability scoring module 235 based on received data and/or other factors. For example, if a threshold amount of received user feedback indicates that text overlaid onto an image was difficult to read, the threshold value may increased depending on the score originally received by the image and text, the types of factors evaluated to determine the score, the amount of user feedback, the reliability of the user feedback, the type of user feedback (i.e., explicit or implicit), etc.

In another embodiment, the readability scoring module 235 compares the readability score to different ranges, each associated with different actions. If the readability score is within a lowest range, the image and the text are displayed separately in a story (e.g., the image and the text are displayed adjacent to each other). If the readability score is within a highest range, a composite of the text overlaid on the image is generated and displayed in a story. If the readability score falls within an intermediate range, the composite of the text overlaid on the image may be manually reviewed with the results of the manual review determining whether the text is overlaid on the image or separately presented when the story is presented.

The readability score may also be used determine an area of an image onto which to overlay text (e.g., top, bottom, side, etc). For example, the readability score calculator 238 may evaluate the factors associated with the received image and text for multiple areas of the image onto which the text may be overlaid and generate a readability score for each of the areas. Readability scores for the various areas are compared to the threshold value to identify candidate areas of the image for overlaying text. If multiple areas of the image have readability scores equaling or exceeding the threshold value, the readability scoring module 235 may identify the area of the image having the highest readability score that equals or exceeds the threshold so text is overlaid on the identified area of the image. For example, the readability score calculator 238 calculates three readability scores for the top, bottom, and right side of an image onto which text may be overlaid. If the highest readability score corresponds to overlaying the text onto the top of the image and is at least equal to the threshold value, the text is overlaid onto the top of the image.

Factors for Determining Readability Score

Various attributes of the text and an associated image are evaluated by the readability score calculator 238 to calculate a readability score for the combination of the text and the image. In various embodiments, the readability score calculator 238 evaluates attributes of the image, attributes of the text associated with the image, and attributes of the combination of the text and the image. Alternatively, the readability score calculate 238 may evaluate a subset of attributes of the image, of the text, and/or of the combination of the image and the text.

If an image includes one or more faces of individuals, the readability score calculator 238 may evaluate the likelihood that a faces included in the image will be obscured by overlaying text onto the image. In one embodiment, the readability score is inversely related to the likelihood of overlaid text obscuring a face in the image, so a higher likelihood of obscuring a face results in a lower readability score. Hence, images including with many faces or images in which faces occupy a large portion of the image may correspond to a lower readability score because overlaid text is more likely to obstruct a user's view of the faces, which are likely to be focal points of the images. Images with no faces or images in which faces occupy only a small area of the image may correspond to higher readability scores.

If an image is associated with metadata indicating the image has been digitally altered, the readability score calculator 238 reduce the readability score corresponding to the image relative to an image that is not associated with metadata indicating the image has been digitally altered. For example, if metadata associated with an image includes file extension associated with an image editing application, the readability score calculator 238 determines the image is likely to have been modified, and reduces a readability score associated with the image accordingly. However, if metadata associated with an image includes information about the type of camera capturing the image, the readability score calculator 238 determines the image is less likely to have been altered and more likely to be an original image, resulting in a higher readability score associated with the image.

The readability score calculator 238 may assign a higher readability score to images including one or more homogeneous areas (i.e., areas having one or more common characteristics or attributes). Thus, a higher readability score is associated with an image including multiple homogenous areas, having a large portion of the image that is a homogeneous area, having a low degree of color distribution over one or more areas (i.e., the color gradient changes very little), having a low magnitude of color contrast over one or more areas, and having at least a threshold magnitude of color contrast between one or more areas and the text that may be overlaid. In one embodiment, a small color distribution over a large area may indicate that the image has been digitally altered, which lowers a readability score associated with the image.

In some embodiments, the readability score calculator 238 also accounts for the length of received text when determining a readability score associated with the text. As longer text takes up more space of an image, longer text is more likely to obstruct a viewer's ability to view details in the image. Therefore, received text having longer lengths is associated with lower readability scores. In one embodiment, text may be truncated and the length of the truncated text is used to determine the readability score associated with the text.

If the social networking system 140 receives images including text, the readability score calculator 238 may associate lower readability score with those images relative to images that do not include text. Overlaying text onto an image with existing text may increase the difficulty of users identifying the text included in the image, the overlaid text, and/or the image itself. If the text detecting module 237 identifies text included in an image, the readability score calculator 238 may reduce a readability score corresponding to the image based on the amount and size of text in the image. In one embodiment, a larger amount or larger size of text in the image corresponds to a lower readability score. For example, the readability score calculator 238 associates a lower readability score to an image including a paragraph of text in size 12 font than to an image including two words of text in size 8 font because text overlaid onto the first image is more likely to be overlaid onto text included in the first image itself than onto text included in the second image.

Additionally, location tags associated with an image may indicate that an image is an original photograph rather than a modified image, so the readability score calculator 238 may assign a higher readability score to images associated with location tags than to images that are not associated with location tags. Images associated with location tags are more likely to be unaltered photographs, while images without location tags are more likely to have been altered or modified. For example, an image tagged with the location Santa Cruz, Calif. is more likely to be an original photograph taken by the user than an image without any tagged location, so the image associated with the tagged location may be associated with a higher readability score than an image not associated with a tagged location.

In some embodiments, the readability score calculator 238 associates a higher readability score to images with a high resolution than to images with a low resolution. For example, the readability score calculator 238 increases a readability score associated with the image if the image has at least a threshold resolution. Images with high resolution (e.g., a high number of pixels per inch) have more detail than lower resolution images. Because details in images with high resolution are less likely to be obscured by overlaid text than details in images with low resolution, readability scores for high resolution images are higher than readability scores for low resolution images.

The readability score calculator 238 may also account for the dimensions of an image when calculating a readability score. Text overlaid onto an image that is very long in one dimension but shorter in another dimension is more likely to be difficult to read than text overlaid onto an image that has dimensions in various directions that are closer to each other, even when the overall areas of the images are similar. For example, text overlaid onto a rectangular image that is eight inches tall and one inch wide (height-to-width ratio of 8:1) will likely have to wrap around several times and take up several lines as compared to text overlaid onto a rectangular image that is four inches tall and two inches wide (height-to-width ratio of 2:1). Therefore, the readability score may be lower for an image with a height-to-width ratio exceeding a threshold ratio relative to the readability score of an image with a height-to-width ratio less than or equal to the threshold ratio. In one embodiment, images may be cropped and the dimensions of cropped images used to calculate the readability score.

Determining Whether to Overlay Text onto Multiple Images

Figure 4:
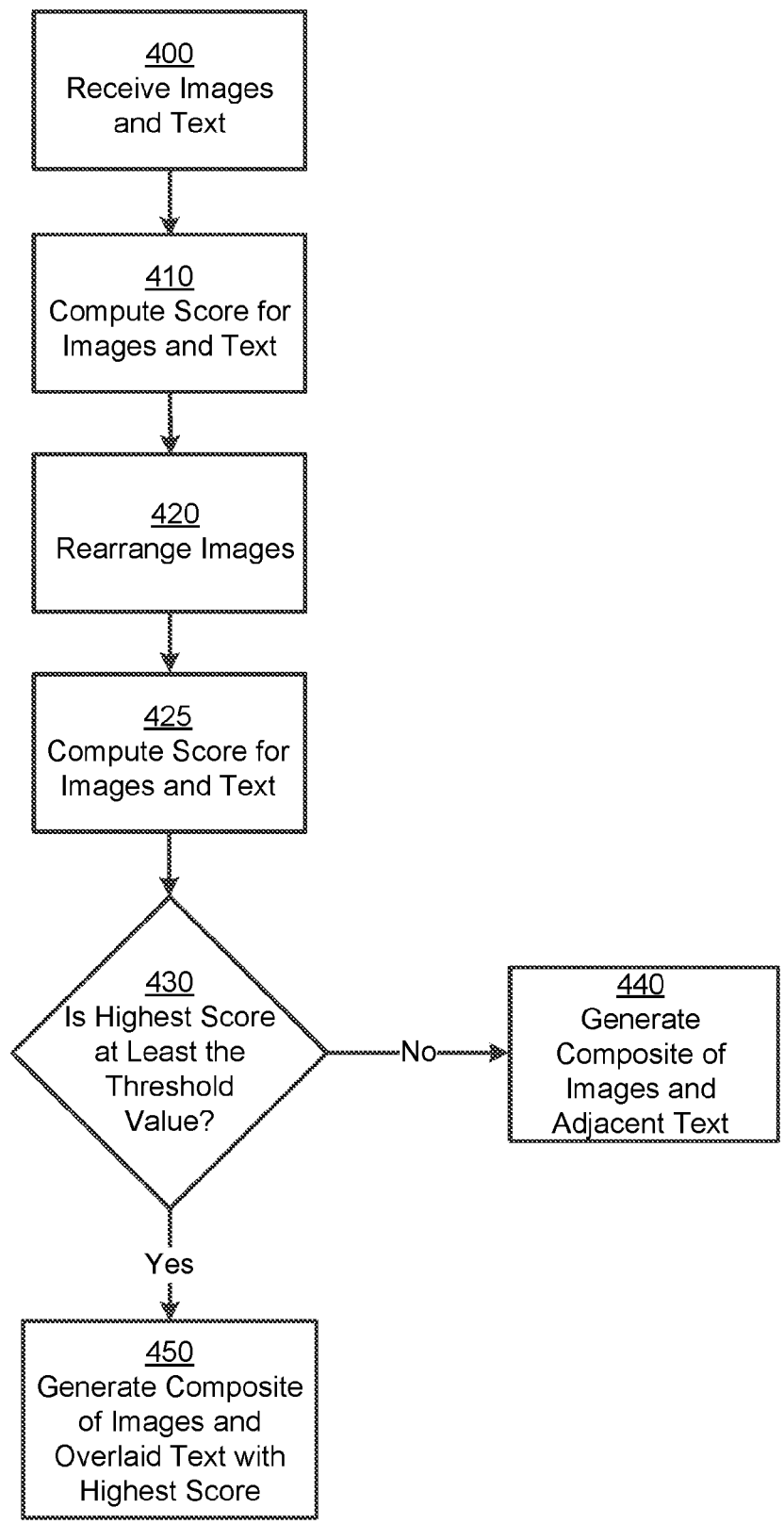
FIG. 4 is a flow chart of a method for determining visibility of text overlaid onto multiple images, in accordance with an embodiment of the invention.

In one embodiment, the readability scoring module 235 determines whether to overlay text onto some or all of a collection of images, such as images included in an album. FIG. 4 shows one embodiment of a method for determining whether text is readable if overlaid onto multiple images. As shown in FIG. 4, the social networking system 140 receives 400 multiple images and text from a user, and the readability score calculator 238 then computes 410 a readability score for overlaying the text onto an area of the images. In one embodiment, some or all of the images may be rearranged 420 and the readability score is recomputed 425. The images may be rearranged multiple times with a readability score recomputed 425 for each of the rearrangements. For example, a readability score is recomputed 425 for a threshold number of rearrangements or a readability score is recomputed 425 for each rearrangement of the images. The readability scoring module 235 identifies the highest readability score associated with a rearrangement of the images and determines 430 if the highest readability score equals or exceeds a threshold value. If the highest readability score is less than the threshold value, the interface generator 220 generates 440 a story presenting the images and the text in a format where the images and text are separately presented. However, if the highest readability score equals or exceeds the threshold value, the interface generator 220 generates 450 a story presenting the images and the text in a format where the text is overlaid onto one or more of the images.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving information about a post in a social networking system, the post comprising a plurality of media items and text associated with the plurality of media items;
determining one or more attributes of each media item of the plurality of media items media item, and at least one attribute of the one or more attributes of each media item of the plurality of media items identifies whether the media item was digitally altered;
computing a readability score for a combination of the plurality of media items and the text associated with each media item of the plurality of media items, the readability score indicating measure of a likelihood of the user reading the text when overlaid onto the plurality of media items and the readability score based at least in part on the one or more attributes of each media item of the plurality of media items and one or more attributes of the text;
determining a particular media item of the plurality of media items was digitally altered based on the one or more attributes of the particular media item;
reducing the readability score for the combination of the particular media item and the text;
comparing the readability score with a threshold value;
generating the post including at least one media item of the plurality of media items and the text associated with the media item based on the comparison, wherein if the readability score for the combination of the at least one media item and the text equals or exceeds the threshold value, the text is overlaid onto an area of the at least one media item, and if the readability score for the combination of the at least one media item and the text is less than the threshold value, the text is positioned adjacent to the at least one media item; and sending the post for display to a client device associated with the user.

2. The method of claim 1, wherein the one or more attributes of the media item further includes an indicator selected from a group consisting of: a likelihood of obscuring faces in the media item by overlaying the media item with the text, homogeneity of one or more areas of the media item, a number of characters included in the text, a size of the text, an indication the media item includes existing text, location tags associated with the media item, a resolution of the media item, dimensions of the media item, and any combination thereof.

3. The method of claim 2, wherein the attribute associated with the media item indicating that the media item has been digitally altered is based on one or more of a group consisting of: information associated with an image editing application, a type of camera capturing image, and any combination thereof.

4. The method of claim 2, wherein the homogeneity of one or more areas of the image item is based on one or more of a group consisting of: a size of the one or more areas, a color distribution in the one or more areas, a magnitude of color contrast in the one or more areas, a magnitude of color contrast between the one or more areas and the text, and any combination thereof.

5. A method comprising:
receiving a plurality of media items and text associated with the plurality of media items;
determining one or more attributes of each media item of the plurality of media items and at least one attribute of the one or more attributes of each media item of the plurality of media items identifies whether the media item was digitally altered;
determining whether to overlay the text onto at least one of the plurality of media items based at least in part on the one or more attributes of each media item of the plurality of media items and one or more attributes of the text, the determining comprising:
computing a readability score for a combination of the plurality of media items and the text associated with each media item of the plurality of media items the readability score indicating measure of a likelihood of the user reading the text when overlaid onto the plurality of media items and the readability score based at least in part on the one or more attributes of the media item and one or more attributes of the text, and
determining a particular media item of the plurality of media items was digitally altered based on the one or more attributes of the particular media item;
reducing the readability score for the combination of the particular media item and the text;
comparing the readability score with a threshold value;
generating a post including at least one media item of the plurality of media items and the text associated with the media item, based on the comparison, wherein if the readability score for the combination of the at least one media item and the text equals or exceeds the threshold value, the text is overlaid onto an area of the at least one media item, and if the readability score for the combination of the at least one media item and the text is less than the threshold value, the text is positioned adjacent to the at least one media item; and
providing the post to the user with the at least one media item and the text in a format based on the comparison.

6. The method of claim 5, wherein the one or more attributes of the media item, the one or more attributes of the text, or any combination thereof is selected from a group consisting of: a likelihood of obscuring faces in the media item by overlaying the media item with the text, homogeneity of one or more areas of the media item, a number of characters included in the text, a size of the text, an indication the media item includes existing text, location tags associated with the media item, a resolution of the media item, dimensions of the media item, and any combination thereof.

7. The method of claim 6, wherein the attribute associated with the media item indicating that the media item has been digitally altered is based on one or more of a group consisting of: information associated with an image editing application, a type of camera capturing image, and any combination thereof.

8. The method of claim 6, wherein the homogeneity of one or more areas of the image item is based on one or more of a group consisting of: a size of the one or more areas, a color distribution in the one or more areas, a magnitude of color contrast in the one or more areas, a magnitude of color contrast between the one or more areas and the text, and any combination thereof.

9. The method of claim 5, wherein the plurality of media items is a plurality of images form a part of a photographic album.

10. The method of claim 5, wherein generating a post including the media item and the text comprise:
generating a message including the at least one media item and the text based on the comparison.

* * * * *

UNITED STATES PATENT AND TRADEMARK OFFICE
CERTIFICATE OF CORRECTION

PATENT NO. : 9,959,250 B2
APPLICATION NO. : 15/147685
DATED : May 1, 2018
INVENTOR(S) : Gregory Matthew Marra et al.

It is certified that error appears in the above-identified patent and that said Letters Patent is hereby corrected as shown below:

In the Claims

Column 14, Line 41, after "media items," delete "media item".
Column 16, Line 43, after "images" insert -- that --.

Signed and Sealed this
Twenty-fifth Day of September, 2018

Andrei Iancu
*Director of the United States Patent and Trademark Office*